(12) United States Patent
Hiebert et al.

(10) Patent No.: US 7,407,189 B2
(45) Date of Patent: Aug. 5, 2008

(54) ELECTRONIC PROPORTIONAL LEVELING CONTROL SYSTEM FOR RECREATIONAL VEHICLES

(75) Inventors: Grant Hiebert, Salmon Arm (CA); Jack Fenkhuber, Salmon Arm (CA)

(73) Assignee: Valid Manufacturing Ltd., Salmon Arm (CA)

( * ) Notice: Subject to any disclaimer, the term of this patent is extended or adjusted under 35 U.S.C. 154(b) by 437 days.

(21) Appl. No.: 11/287,246

(22) Filed: Nov. 28, 2005

(65) Prior Publication Data

US 2007/0120350 A1    May 31, 2007

Related U.S. Application Data

(60) Provisional application No. 60/630,994, filed on Nov. 24, 2004.

(51) Int. Cl.
 *B60S 9/02*    (2006.01)
(52) U.S. Cl. .................................. 280/766.1; 280/6.153
(58) Field of Classification Search ............. 280/766.1, 280/6.15, 6.153, 6.154, 6.155, 6.157, 6.159

See application file for complete search history.

(56) References Cited

U.S. PATENT DOCUMENTS

| | | | | | |
|---|---|---|---|---|---|
| 4,232,488 | A | * | 11/1980 | Hanley | 52/7 |
| 4,784,400 | A | * | 11/1988 | Hofius | 254/93 VA |
| 5,188,379 | A | * | 2/1993 | Krause et al. | 254/423 |
| 5,676,385 | A | * | 10/1997 | Schneider et al. | 280/6.153 |
| 6,176,495 | B1 | * | 1/2001 | Decker | 280/6.153 |
| 7,261,304 | B2 | * | 8/2007 | Trudeau et al. | 280/6.153 |

* cited by examiner

*Primary Examiner*—Faye M. Fleming
(74) *Attorney, Agent, or Firm*—Antony C. Edwards (57) ABSTRACT

Microprocessors read the tilt of a vehicle as indicated by lateral and longitudinal tilt sensors, and predict the amount of jack actuation needed to level the vehicle. Once an attempt is made to level the vehicle, the system may pause for a configurable amount of time to allow the oscillations of the vehicle to subside. Once the vehicle motion, if any, has stopped, the tilt angles of the vehicle are once again checked and any further actuation of the jacks is taken to fine tune the attitude of the vehicle.

25 Claims, 5 Drawing Sheets

ELECTRONIC PROPORTIONAL LEVELING CONTROL SYSTEM FOR RECREATIONAL VEHICLES

CROSS REFERENCE TO RELATED APPLICATION

This application claims priority from U.S. Provisional Patent Application No. 60/630,994 filed Nov. 26, 2004 entitled Electronic Suspension and Proportional Level Control System for Recreational Vehicles.

FIELD OF THE INVENTION

This invention relates to the field of vehicle level control systems.

BACKGROUND OF THE INVENTION

Once a recreational vehicle has been parked, it is desirable to level the vehicle. Sensing devices are known in the prior art, including mercury switches, electrolytic liquids or accelerometers. These have been used in the prior art, with varying degrees of success, to attempt leveling. A problem with any of these sensors is that in order to make them sensitive enough to measure the tilt angle of a vehicle accurately, where the angle may be relatively small and still large enough to affect the performance of slide outs, etc, the sensors tend to be overly sensitive to the shock or bump imparted by the leveling actuators, especially when these actuators are, as they are conventionally, hydraulic or electric screw jacks. Regardless of the style of jack, the chance of actually being able to correctly determine the exact point at which a vehicle becomes level may be very difficult due to the impulses, such as impulses A, B and C in FIG. 1*b*, imparted on the sensing element.

The following is a description of how the accelerometers within accelerometer-type tilt sensing devices operate: The accelerometer in such a device is used to measure acceleration along one or more axis of sensitivity. Conventionally, accelerometers measure the acceleration of a body to which the accelerometer is attached. However, in a tilt sensor, the sensor is placed so that one of its measurement axes is substantially perpendicular to the pull of the earth's gravity. As the sensor is tilted so that the relationship between the sensor and gravity is no longer perpendicular, the amount of tilt is determined by measuring the amount of gravitational pull being measured. At a perpendicular state, the amount measured is zero. If the sensor were rotated to become parallel, the amount measured would be 1 G (or 32.17 ft/sec$^2$). At any position in between, the tilt angle can be derived by the following formula.

$$\text{tilt\_angle} = \sin^{-1}\left(\frac{MeasuredValue}{32.17 \frac{\text{ft}}{\text{sec}^2}}\right)$$

It is therefore an object of the present invention to provide a method of vehicle leveling that provides for very accurate leveling while compensating for the shock imparted into the vehicle and therefore measured by the sensing device.

It is another object of the present invention to provide a control system and method of leveling of the vehicle using either a two-axis sensor or multiple lateral and longitudinal tilt sensing axes.

It is another object of the present invention to provide a control system and method of leveling of the vehicle using three or four leveling jacks.

It is another object of the present invention to provide a control system and method for leveling a vehicle wherein each corner of the vehicle may be independently or cooperatively raised or lowered.

It is a further object of the present invention to provide a control system and method for leveling a vehicle wherein an operator may manually adjust the height of each individual corner or group of corners of the vehicle without exceeding a certain amount of chassis twist.

SUMMARY OF THE INVENTION

The present invention is an advanced vehicle level control method wherein one or more microprocessors is used to predict the amount of action needed to be taken by the leveling jacks in order to level the vehicle. Once an attempt is made to level the vehicle, the system will pause for a configurable amount of time and allow the oscillations of the vehicle to subside. Once the vehicle motion has stopped, the tilt angles of the vehicle are once again checked and any required actions are taken to fine tune the attitude of the vehicle. The method varies depending on the number and types of sensing devices used, and also on the number of leveling jacks used.

In summary, the present invention may be characterized in one aspect as a method of proportional leveling of a recreational vehicle, wherein the method comprises the steps of:
1) firstly, ensuring that all jacks are in contact with the ground.
2) secondly, proportionally laterally leveling the vehicle by sequentially:
   (a) identifying a low side of the vehicle, and if no side is lower than the other then taking no further action if the vehicle has already longitudinally levelled, and otherwise, if no side is lower than the other, commencing to longitudinally level the vehicle,
   (b) calculating first time periods required to extend at least one jack of the at least three jacks, wherein the at least one jack is on the identified low side, in order to bring the vehicle to a first estimated level position laterally,
   (c) extending the at least one jack on the identified low side for the calculated first time periods to achieve the first estimated level position laterally,
   (d) pausing as necessary to let vehicle motion if any subside,
   (e) re-checking the lateral leveling of the vehicle and if not yet laterally level then re-executing the steps (b) to (d) to laterally level the vehicle using at least one, of the jacks of the at least one jack on the identified low side, and
   (f) if a laterally level position has been exceeded, and the vehicle has gone past laterally level, for at least one of the jacks of the at least one jack then:
      (i) calculating second time periods required to retract the at least one of the jacks of the at least one jack on the identified low side in order to bring the vehicle to a level position laterally, and
      (ii) retracting the at least one of the jacks of the at least one jack on the identified low side for the calculated second time periods to achieve the level position laterally,
   and for proportionally longitudinally leveling the vehicle by sequentially:
   (g) identifying a low end of the vehicle, and if no end of the vehicle is lower than the other end of the vehicle then taking no further action if the vehicle has already been laterally levelled, and, if no end of the vehicle is lower than the other end, otherwise commencing to laterally level the vehicle, (h) calculating third time periods required to extend at least one jack of the at least three jacks, wherein the at least one jack is on the identified low end, in order to bring the vehicle to a first estimated level position longitudinally, (i) extending the at least one jack on the identified low end for the calculated third periods to achieve the first estimated level position longitudinally, (j) pausing as necessary to let vehicle motion if any subside, (k) re-checking the longitudinal leveling of the vehicle and if not yet longitudinally level then re-executing the steps (h) to (j) to longitudinally level the vehicle using at least one of the jacks of the at least one jack on the identified low end, and (l) if the longitudinally level position has been exceeded and the vehicle has gone past longitudinally level, for at least one of the jacks of the at least one jack then:
  (i) calculating fourth time periods required to retract the at least one of the jacks of the at least one jack on the identified low end in order to bring the vehicle to a level position longitudinally, and
  (ii) retracting the at least one of the jacks of the at least one jack on the identified low end for the calculated fourth time periods to achieve the level position longitudinally.

Preferably, when the at least one of the jacks of the at least one jack are two jacks of the four jacks, and the two jacks are on the low side of the vehicle, the two jacks are autonomously actuable so as to attain the level position laterally of both the ends of the vehicle.

Once the above steps (a) to (f) and (g) to (l) have been executed:

(m) if steps (a) to (f) were executed before steps (g) to (l), then the method may include re-checking the lateral leveling of the vehicle and if not yet laterally level then re-executing the steps (b) to (d) to laterally level the vehicle using calculated fifth time periods to achieve a level position laterally, and if a laterally level position has been exceeded, and the vehicle has gone past laterally level, then re-executing the step (f) to achieve a level position laterally, or (n) if steps (g) to (l) were executed before steps (a) to (f), then the method may include re-checking the longitudinal leveling of the vehicle and if not yet longitudinally level then re-executing the steps (h) to (j) to longitudinally level the vehicle using calculated sixth time periods to achieve a level position longitudinally and if the longitudinally level position has been exceeded and the vehicle has gone past longitudinally level, then re-executing the step (l) to achieve a level position longitudinally.

Preferably, the steps of calculating the time periods to extend at least one jack of the at least three jacks is calculated using configurable constants, for example, lateral roll rates and longitudinal roll rates. In one embodiment, the constants may be determined by automatic tuning of the at least three jacks to determine the roll and pitch rates imparted by individual jacks of the at least three jacks.

The method may further include the step of identifying which of the at least three jacks is in contact with the highest ground elevation and therefore is a reference jack, and thereafter until leveling is achieved only actuating jacks of the at least three jacks which are not the reference jack.

Thus it may be seen that one advantage of the method and apparatus according to the present invention is that, because one jack is used as a reference jack that is in contact with the highest point of ground, and that reference jack is neither then raised or lowered, a minimized amount of energy is expended during leveling. That is, the use of hydraulic pumping or electric motors is kept to a minimum, and yet accurate lateral and longitudinal leveling is achieved.

It is understood that the method employs a minimum of three jacks, in which two jacks are in each corner at one end of the vehicle and the third laterally centered at the opposite end. Alternatively, with four or more jacks, at least one jack is mounted in each corner of the vehicle, all of which may be actuated autonomously.

It is further understood that the method employs a minimum of one lateral tilt axis sensor and one longitudinal tilt axis sensor, which may be both laterally centrally mounted at one end of the vehicle chassis, and which may be combined in one sensor unit or package. If more tilt axis sensors are employed for example at one end or the other for lateral tilt, their tilt data are averaged to determine which side of the vehicle is initially low.

Pitch and/or roll rates of the chassis during leveling may be monitored and employed to assist in more accurately determining the time calculations for extending or retracting the jacks to achieve leveling.

BRIEF DESCRIPTION OF THE DRAWINGS

FIG. 1b illustrates the accelerometer readings along the X and Y axes of FIG. 1a.

What follows are descriptions of three representative embodiments of the present invention which, although not intended to be limiting, illustrate the inventive aspects of an advanced electronic suspension and proportional leveling control system according to the present invention for use in recreational vehicles. The three representative embodiments are set out in separate sections in this specification as follows: (1) one lateral axis sensor, one longitudinal axis sensor, four leveling jacks; (2) one lateral axis sensor, one longitudinal axis sensor, three leveling jacks; and (3) multiple lateral axis sensors, one or more longitudinal axis sensors, four leveling jacks.

One Lateral Axis Sensor, One Longitudinal Axis Sensor, Four Leveling Jacks

Figure 1A:
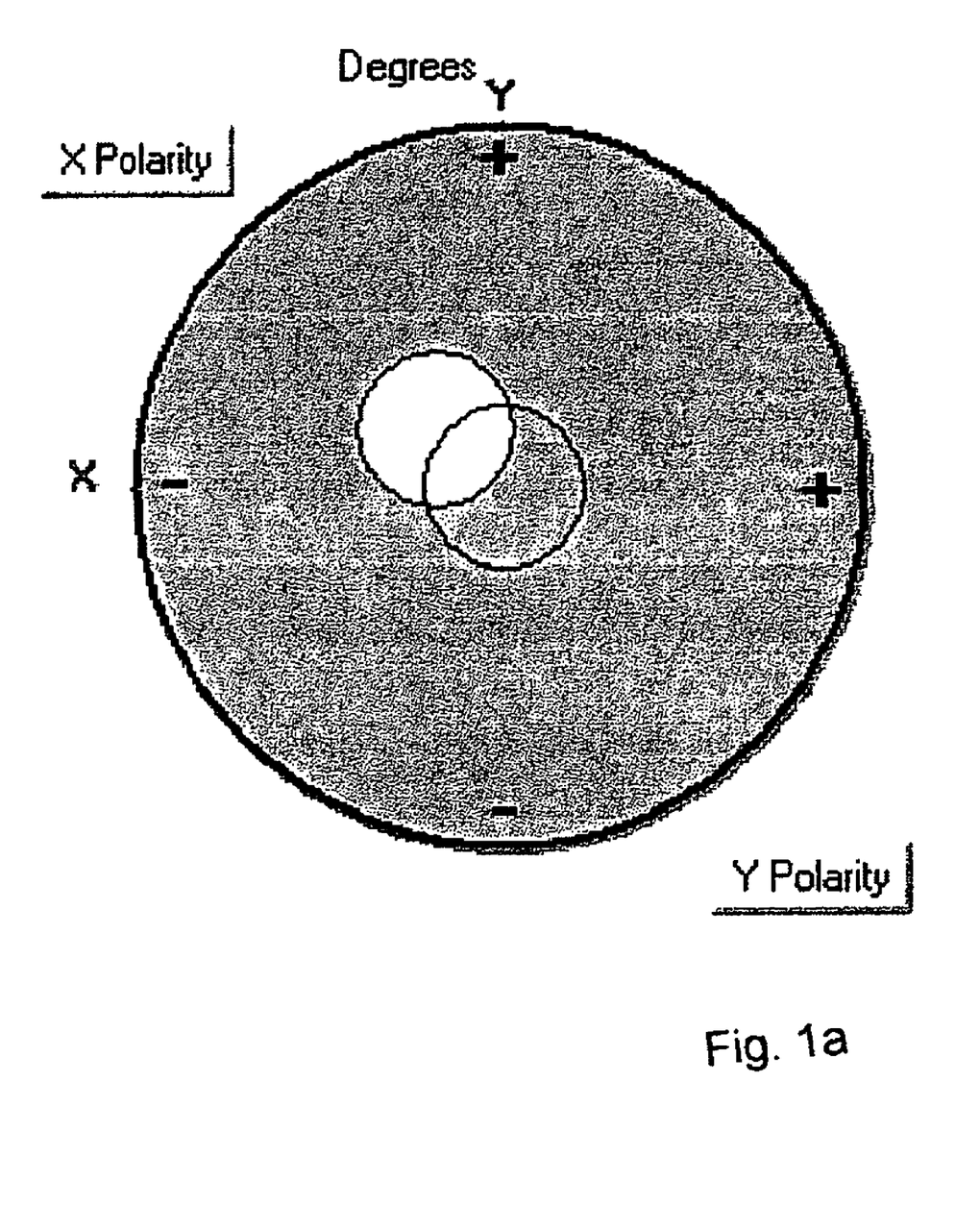
FIG. 1a illustrates a leveling indicator as shown on a display as computed according to the present invention.
Figure 1B:
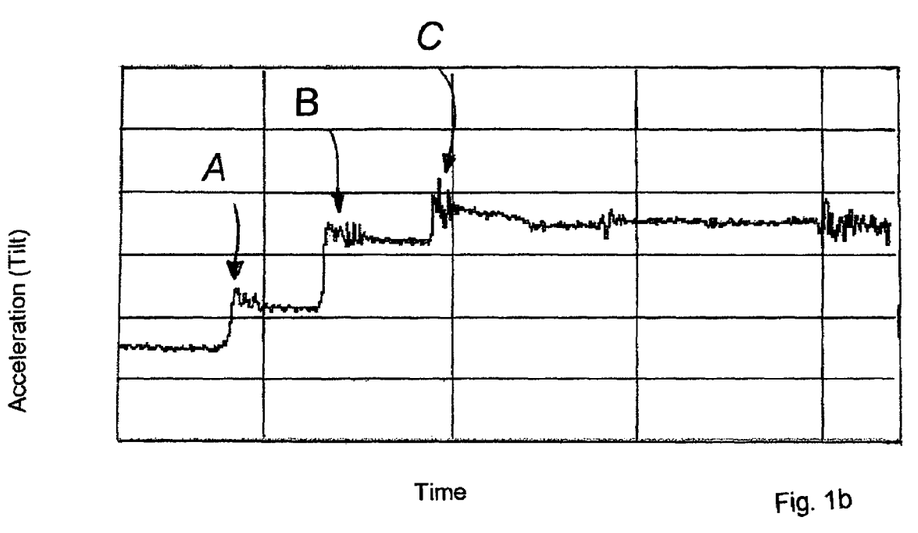
Figure 2:
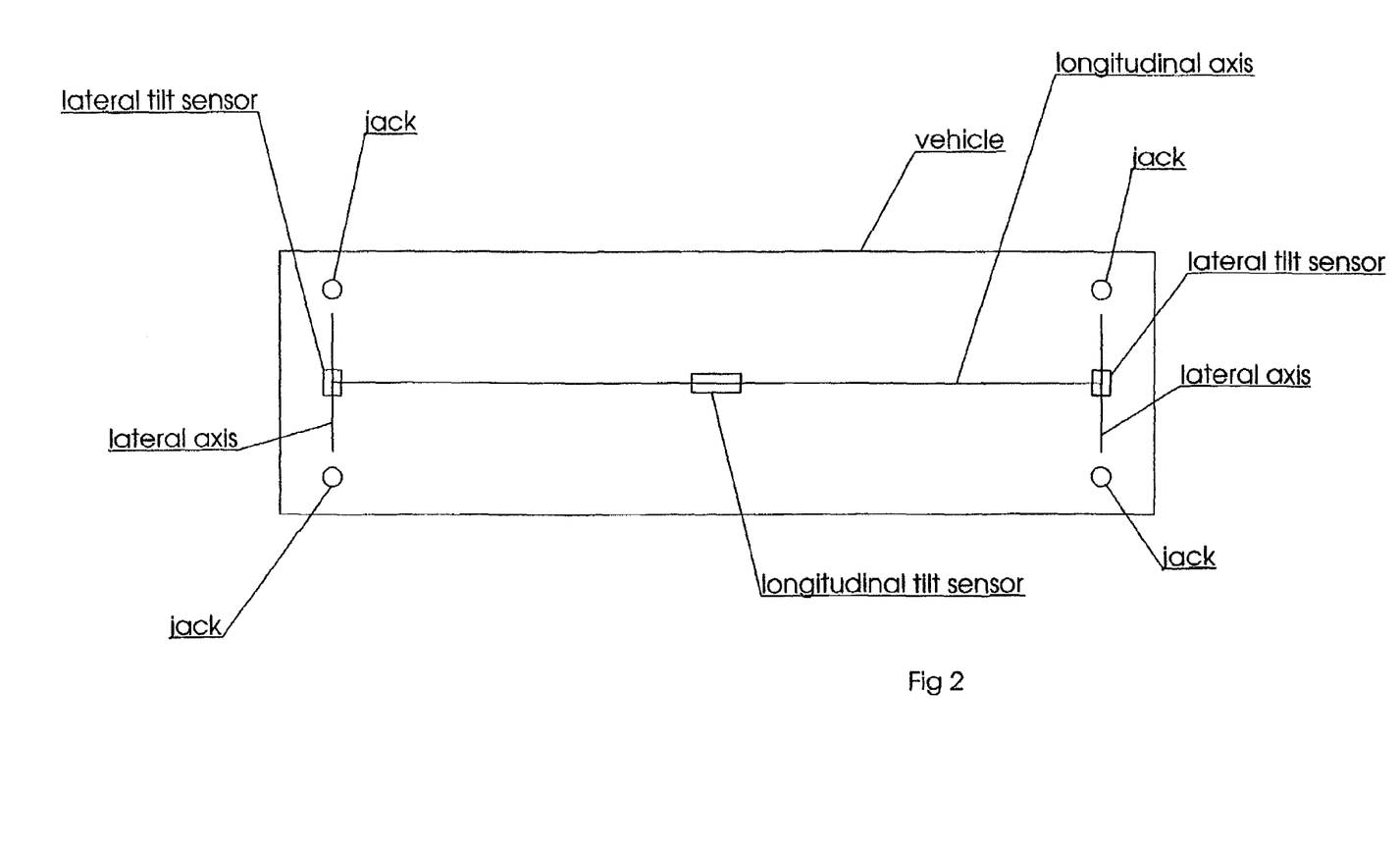
FIG. 2 is a diagrammatic bottom view of a recreational vehicle having four leveling jacks and multiple lateral tilt sensors.
Figure 3:
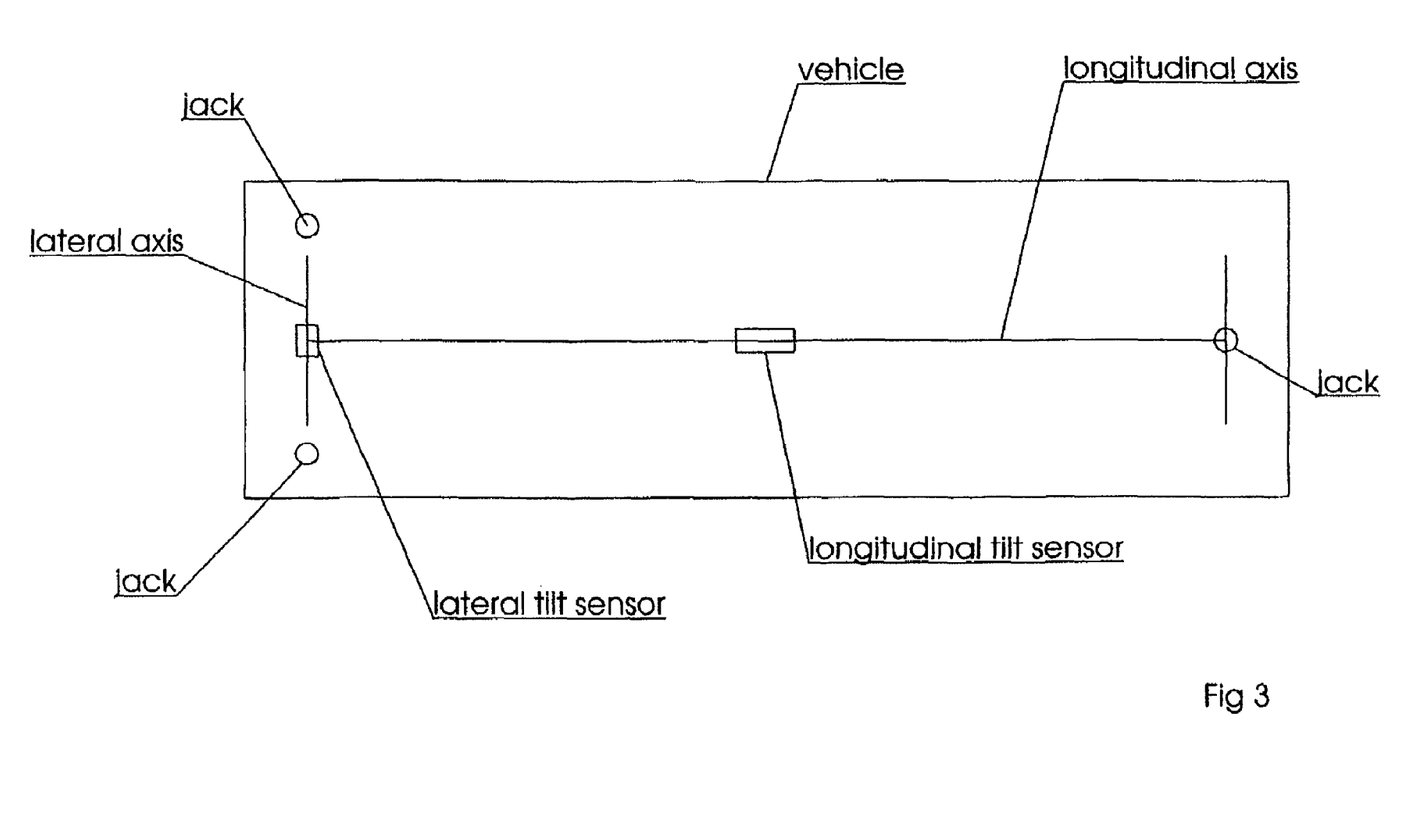
FIG. 3 is a diagrammatic bottom view of a recreational vehicle having three leveling jacks.
Figure 4:
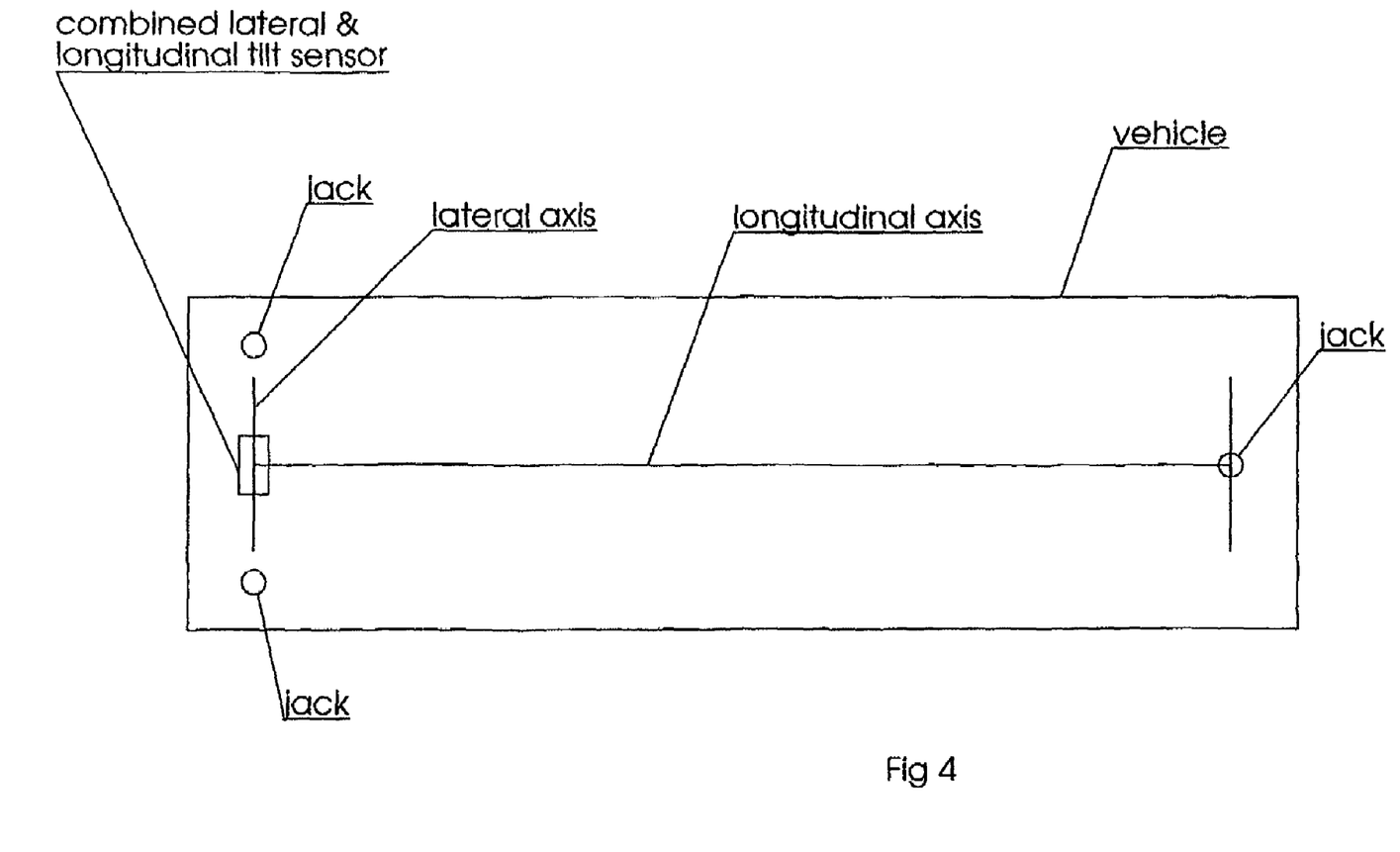
FIG. 4 is a diagrammatic bottom view of a recreational vehicle having three levelling jacks and one combined lateral and longitudinal tilt sensor.

This section describes a method for leveling a vehicle using a two axis sensor, one axis for sensing lateral leveling and another for sensing longitudinal leveling and four leveling jacks, one located near each corner of the vehicle. A graphic illustration of the output of the two axis sensor is seen in FIGS. 1a and 1b. As seen in FIG. 1b, actuation of the jacks impart impulses, shown as impulses A, B and C, which result in oscillatory vehicle motion.

Once all jacks are in contact with the ground, the proportional method of leveling according to the present invention begins. The system now determines which side (if any) is low.

It then uses configurable constants to calculate the amount of time required to extend the jacks on the low side in order to bring the vehicle to a level position, for example, first laterally. The system then extends the jacks for the calculated amount of time. Once the extend cycle completes, the system pauses as necessary depending on the vehicle dynamics such as oscillations due to the actuators abruptly actuating, and lets such vehicle motion, if any, subside. The system then re-checks the lateral position and if further action is required to achieve a level state it again calculates an actuation time and then causes the movement of the same pair of jacks. If the vehicle has yet to reach a lateral level state, this next action would be to again extend the jacks. If however the vehicle is now determined to have gone past level, then the jacks would retract. This cyclic action continues until it is determined by the system that the vehicle is within an acceptable lateral level range.

In the instance that lateral leveling commenced first, then the system examines the longitudinal sensing axis and performs similar actions with the pair of jacks located on the low end of the vehicle. If the action taken to level the vehicle falls short of achieving an acceptable longitudinal level position, the same end jacks are again extended. If however the prior action has caused the vehicle to go past an acceptable longitudinal level position, the same end jacks are retracted in order to bring the vehicle closer to a longitudinal level state. In the instance that longitudinal leveling commenced first, then lateral leveling would follow the longitudinal leveling. If this method is followed, with either lateral or longitudinal leveling done first, it can be seen that one of the jacks that was initially brought into contact with the ground was never extended or retracted again since being initially brought into contact with the ground. This jack has become the reference jack and has been selected by the system because it is the jack that is in contact with the highest point of ground.

One Lateral Axis Sensor, One Longitudinal Axis Sensor, Three Leveling Jacks

This section describes a method for leveling a vehicle using a two axis sensor, one axis for lateral tilt sensing and another for longitudinal tilt sensing and three leveling jacks, one jack laterally centered near one end of the vehicle and the other two jacks located near each opposite corner of the opposite end of the vehicle.

Once all jacks are in contact with the ground the proportional method of leveling begins. The system now determines which side (if any) is low. It then uses configurable constants to calculate the amount of time required to extend the jack on the low side in order to bring the vehicle to a level position laterally. The system then extends the jack for the calculated amount of time. Once the extend cycle completes, the system pauses and lets the vehicle motion if any, such as oscillatory motion, subside. It then re-checks the lateral position and if further action is required to achieve a level state it again causes the movement of the same jack. If the vehicle has yet to reach a lateral level state, this next action would be to again extend the jack. If however the vehicle is now determined to have gone past level, then the jack would retract. In a preferred embodiment, this cyclic action continues until it is determined by the system that the vehicle is within an acceptable (configurable) lateral level range. The system now looks at the longitudinal sensing axis and determines which end is low. The required end jack(s) are then similarly extended for a calculated amount of time in order to bring the vehicle to a longitudinal level state. If the action taken to level the vehicle falls short of achieving an acceptable longitudinal level position, the same end jack(s) are again extended. If however the prior action has caused the vehicle to go past an acceptable longitudinal level position, the same end jack(s) are retracted in order to bring the vehicle closer to a longitudinal level state. If this method is followed, it can be seen that one of the jacks that was initially brought into contact with the ground was never extended or retracted since that time. This jack has become the reference jack and has been selected by the system because it is the jack that is in contact with the highest point of ground.

Multiple Lateral Axis Sensors, Multiple Longitudinal Axis Sensors, 4 Leveling Jacks This section describes a method for leveling a vehicle using multiple lateral tilt sensing axes (for example one at each end of the vehicle), one or more longitudinal tilt sensing axes and four leveling jacks (one located near each corner of the vehicle).

Once all jacks are in contact with the ground the proportional method of leveling begins. The system now checks the longitudinal sensing axis (or the average of all the longitudinal sensing axes) to determine which end of the vehicle is lowest. Once the low end is determined, the lateral tilt sensor for that end is analyzed to determine which side of the low end is lowest. The jack for that corner is then selected for extension. If the same side of the other end is also low then both jacks on that side of the vehicle are simultaneously extended by a timed amount calculated from configurable constants that should bring the least tilted end to a level state. If the same side of the other end is not low then only the low end, low side jack will extend and it will be extended by an amount calculated from configurable constants that should bring the low end of the vehicle to a laterally level state.

Once the extend cycle completes, the system pauses for the dynamics of the particular vehicle and characteristics of the tilt sensors, and lets the vehicle motion subside, for example the oscillatory motion shown in FIG. 1b. The system then re-checks the lateral position of the low end and if further action is required to achieve a level state at the low end then the system again checks on whether it should move the same side of the high end in order to prevent chassis twist. If the vehicle has yet to reach a lateral level state on the low end, this next action would be to again extend the jack(s). If however the vehicle is now determined to have gone past level on the low end, then the jack(s) would retract. In a preferred embodiment, this cyclic action continues until it is determined by the system that the low end of the vehicle is within an acceptable (configurable) lateral level range. When the system is commanded to enter auto-lateral leveling mode each lateral tilt sensor and control module will autonomously level its portion of the vehicle laterally and report when completed via a controller area network (CAN) to a central processor or controller, or report failing to achieve lateral level. The controller will for example in a manual control mode, restrict or limit motion to a configurable amount of measured differential tilt/acceleration between lateral sensing axes so as to not exceed a pre-specified amount of twist to the chassis in order to avoid damage.

After the low end of the vehicle has been leveled the system monitors the lateral tilt sensor of the high end to determine which side of the high end is lowest. The jack for that corner is then extended for a timed amount calculated from configurable constants that should bring the high end to a laterally level state. Once the extend cycle completes, the system pauses and lets the vehicle motion subside. It then re-checks the lateral position of the high end and if the vehicle has yet to reach a lateral level state on the high end, this next action would be to again extend the jack. If however the vehicle is now determined to have gone past lateral level on the high end, then the jack would retract. In a preferred embodiment, this cyclic action continues until it is determined by the system that the high end of the vehicle is within an acceptable lateral level range.

Once the vehicle is leveled laterally on both ends, the system checks the longitudinal position sensor(s) and determines which end is low. On systems with a single longitudinal sensing axis this is done my analyzing the one axis but on units with multiple longitudinal sensing axes this is done by averaging all of the longitudinal sensing axes. The jacks for the low end are simultaneously extended for a timed amount calculated from configurable constants that should bring the vehicle to a longitudinally level state. Once the extend cycle completes, the system pauses and lets the vehicle motion subside. It then re-checks the longitudinal position of the vehicle and if it has yet to reach a longitudinally level state the next action would be to again extend the low end jacks. If however the vehicle is now determined to have gone past longitudinal level then the jacks would retract. At the completion of each end lift cycle the lateral sensor for that end is monitored and any lateral tilt corrections are performed for that end before the end jacks are again moved as a pair. In a preferred embodiment, this cyclic action continues until it is determined by the system that each end of the vehicle is laterally level and that the vehicle as a whole is longitudinally level.

Once the vehicle is initially leveled laterally as well as longitudinally, the system may be programmed to cycle through additional iterations of the above movements in order to bring the entire vehicle to a more accurate level state.

If the method according to one aspect of the present invention, as set out above, is followed, it can be seen that one of the jacks that was initially brought into contact with the ground was never extended or retracted since being initially brought into contact with the ground. This jack has become the reference jack and has been selected by the system because it is the jack that is in contact with the highest point of ground.

Regardless of the number of tilt sensing axes or leveling jacks there are a number of constants that need to be configured into the leveling system in order for it to successfully predict that amount of time to extend or retract the leveling jacks. Some of those parameters are listed below:

(a) Lateral extend front
The value is used to determine the roll rate imparted on the vehicle when a single front jack is extended.
(b) Lateral retract front
The value is used to determine the roll rate imparted on the vehicle when a single front jack is retracted.
(c) Lateral extend rear
The value is used to determine the roll rate imparted on the vehicle when a single rear jack is extended.
(d) Lateral retract rear
The value is used to determine the roll rate imparted on the vehicle when a single rear jack is retracted.
(e) Longitudinal extend front
The value is used to determine the pitch rate imparted on the vehicle when all front jacks are extended simultaneously.
(f) Longitudinal retract front
The value is used to determine the pitch rate imparted on the vehicle when all front jacks are retracted simultaneously.
(g) Longitudinal extend rear
The value is used to determine the pitch rate imparted on the vehicle when all rear jacks are extended simultaneously.
(h) Longitudinal retract rear
The value is used to determine the pitch rate imparted on the vehicle when all rear jacks are retracted simultaneously.
(i) Vehicle settle time
This is the amount of time that the vehicle would be allowed to settle after extending or retracting any leveling jacks and before the vehicle level state is re-checked by the control system.
(j) Sensor output filter
This value controls the number of sensor samples that are averaged before determining the current position of a leveling axis. The higher the value, the more accurate the tilt angle can be measured but it will take longer to measure it.

These values are used to determine the amount of time that a given jack or jacks must be activated in order to affect the desired amount of vehicle movement. In systems that use hydraulic jacks, these values need to be modified in programming to compensate for the fact that as more jacks are extended or retracted they must share the same hydraulic pump flow and therefore the rates will be affected accordingly. In vehicles that use electric screw jacks, these values remain mostly constant regardless of the number of jacks being extended or retracted because each jack operates with its own power source and is therefore not influenced by whether or not other jacks are being used at the same time.

An additional level of automation may be introduced to this system by adding an automatic tuning feature. Once the jacks (hydraulic or electric) are in contact with the ground, the system individually extends each leveling jack for a known amount of time and measures the amount of tilt angle change made by each jack. Then, each jack is individually retracted for a known amount of time and again the amount of tilt angle change made by each jack is measured. These measured roll and pitch rates are then used in place of the manually programmed constants referred to earlier in this description.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of proportional leveling of a recreational vehicle having at least one tilt sensor and at least three jacks, at least two of which are laterally spaced apart and at least two of which are longitudinally spaced apart along the vehicle, and wherein the jacks have all been brought into contact with the ground, the method comprising the steps of:

proportionally laterally leveling the vehicle by sequentially:

(a) identifying a low side of the vehicle, and if no side is lower than the other then taking no further action if the vehicle has already longitudinally levelled, and otherwise, if no side is lower than the other, commencing to longitudinally level the vehicle, (b) calculating first time periods required to extend at least one jack of the at least three jacks, wherein the at least one jack is on the identified low side, in order to bring the vehicle to a first estimated level position laterally, (c) extending the at least one jack on the identified low side for the calculated first time periods to achieve the first estimated level position laterally, (d) pausing as necessary to let vehicle motion if any subside, (e) re-checking the lateral leveling of the vehicle and if not yet laterally level then re-executing the steps (b) to (d) to laterally level the vehicle using at least one, of the jacks of said at least one jack on the identified low side, and (f) if a laterally level position has been exceeded, and the vehicle has gone past laterally level, for at least one of the jacks of said at least one jack then:

(i) calculating second time periods required to retract the at least one of the jacks of said at least one jack on the identified low side in order to bring the vehicle to a level position laterally, and (ii) retracting the at least one of the jacks of said at least one jack on the identified low side for the calculated second time periods to achieve the level position laterally, proportionally longitudinally leveling the vehicle by sequentially:

(g) identifying a low end of the vehicle, and if no end of the vehicle is lower than the other end of the vehicle then taking no further action if the vehicle has already been laterally levelled, and, if no end of the vehicle is lower than the other end, otherwise commencing to laterally level the vehicle, (h) calculating third time periods required to extend at least one jack of the at least three jacks, wherein the at least one jack is on the identified low end, in order to bring the vehicle to a first estimated level position longitudinally, (i) extending the at least one jack on the identified low end for the calculated third periods to achieve the first estimated level position longitudinally, (j) pausing as necessary to let vehicle motion if any subside, (k) re-checking the longitudinal leveling of the vehicle and if not yet longitudinally level then re-executing the steps (h) to (j) to longitudinally level the vehicle using at least one of the jacks of said at least one jack on the identified low end, and (l) if the longitudinally level position has been exceeded and the vehicle has gone past longitudinally level, for at least one of the jacks of said at least one jack then:

(i) calculating fourth time periods required to retract the at least one of the jacks of said at least one jack on the identified low end in order to bring the vehicle to a level position longitudinally, and (ii) retracting the at least one of the jacks of said at least one jack on the identified low end for the calculated fourth time periods to achieve the level position longitudinally.

2. The method of claim 1 comprising the further steps, once steps (a) to (f) and (g) to (l) of claim 1 have been executed, of:

if steps (a) to (f) of claim 1 were executed before steps (g) to (l) of claim 1, then re-checking the lateral leveling of the vehicle and if not yet laterally level then re-executing the steps (b) to (d) of claim 1 to laterally level the vehicle using calculated fifth time periods to achieve a level position laterally, and if a laterally level position has been exceeded, and the vehicle has gone past laterally level, then re-executing the step (f) of claim 1 to achieve a level position laterally, or if steps (g) to (l) of claim 1 were executed before steps (a) to (f) of claim 1, then re-checking the longitudinal leveling of the vehicle and if not yet longitudinally level then re-executing the steps (h) to (j) of claim 1 to longitudinally level the vehicle using calculated sixth time periods to achieve a level position longitudinally and if the longitudinally level position has been exceeded and the vehicle has gone past longitudinally level, then re-executing the step (l) of claim 1 to achieve a level position longitudinally.

3. The method of claim 1 wherein said steps of calculating the time periods to extend at least one jack of the at least three jacks is calculated using configurable constants.

4. The method of claim 2 wherein said step of calculating the time periods to extend at least one jack of the at least three jacks is calculated using configurable constants.

5. The method of claim 1 wherein said at least three jacks consists of only three jacks.

6. The method of claim 5 wherein said three jacks include one jack mounted at a first end, and the remaining two jacks mounted at an opposite second end and laterally spaced apart from one another.

7. The method of claim 2 wherein said at least three jacks consists of only three jacks.

8. The method of claim 7 wherein said three jacks include one jack mounted at a first end, and the remaining two jacks mounted at an opposite second end and laterally spaced apart from one another.

9. The method of claim 1 wherein said at least three jacks includes four jacks.

10. The method of claim 9 wherein said four jacks are mounted at four separate corners of the vehicle.

11. The method of claim 2 wherein said at least three jacks includes four jacks.

12. The method of claim 11 wherein said four jacks are mounted at four separate corners of the vehicle.

13. The method of claim 1 further comprising the step of providing at least one lateral axis tilt sensor and at least one longitudinal axis tilt sensor as said tilt sensor.

14. The method of claim 2 further comprising the step of providing at least one lateral axis tilt sensor and at least one longitudinal axis tilt sensor as said tilt sensor.

15. The method of claim 13 wherein said tilt sensor includes at least one accelerometer tilt sensor.

16. The method of claim 14 wherein said tilt sensor includes at least one accelerometer tilt sensor.

17. The method of claim 13 wherein said at least one lateral axis tilt sensor and said at least one longitudinal axis tilt sensor are all accelerometer tilt sensors.

18. The method of claim 14 wherein said at least one lateral axis tilt sensor and said at least one longitudinal axis tilt sensor are all accelerometer tilt sensors.

19. The method of claim 1 further comprising the step of identifying which of the at least three jacks is in contact with the highest ground elevation and therefore is a reference jack, and thereafter until leveling is achieved only actuating jacks of the at least three jacks which are not said reference jack.

20. The method of claim 2 further comprising the step of identifying which of the at least three jacks is in contact with the highest ground elevation and therefore is a reference jack, and thereafter until leveling is achieved only actuating jacks of the at least three jacks which are not said reference jack.

21. The method of claim 3 wherein said configurable constants are lateral roll rates and longitudinal pitch rates.

22. The method of claim 4 wherein said configurable constants are lateral roll rates and longitudinal pitch rates.

23. The method of claim 21 wherein said configurable constants are determined by automatic tuning of said at least three jacks to determine said roll and pitch rates imparted by individual jacks of said at least three jacks.

24. The method of claim 22 wherein said configurable constants are determined by automatic tuning of said at least three jacks to determine said roll and pitch rates imparted by individual jacks of said at least three jacks.

25. The method of claim 12 wherein the at least one of the jacks of said at least one jack are two jacks of said four jacks, and said two jacks on the low side of the vehicle, said two jacks autonomously actuable so as to attain said level position laterally of both said ends of said vehicle.

* * * * *